US006377168B1

(12) United States Patent
Harvey

(10) Patent No.: US 6,377,168 B1
(45) Date of Patent: Apr. 23, 2002

(54) ENGINE OPERATION DETECTING CIRCUIT FOR A VISUAL DISPLAY

(75) Inventor: Arthur James Harvey, Mantua, OH (US)

(73) Assignee: Delta Systems, Inc., Streetsboro, OH (US)

( * ) Notice: Subject to any disclaimer, the term of this patent is extended or adjusted under 35 U.S.C. 154(b) by 25 days.

(21) Appl. No.: 09/656,578

(22) Filed: Sep. 7, 2000

(51) Int. Cl.[7] .................................................. B60Q 1/00
(52) U.S. Cl. ................... 340/439; 340/648; 123/426.56
(58) Field of Search ................................. 340/438, 439, 340/441, 648; 123/406.56, 406.57

(56) References Cited

U.S. PATENT DOCUMENTS

| | | | | |
|---|---|---|---|---|
| 3,992,070 A | | 11/1976 | Dunn et al. | |
| 4,129,037 A | | 12/1978 | Toalson | |
| 4,144,862 A | | 3/1979 | Estkowski | |
| 4,181,883 A | | 1/1980 | Beeghly et al. | |
| 4,187,927 A | | 2/1980 | Byrne | |
| 4,280,457 A | | 7/1981 | Bloxham | |
| 4,613,939 A | | 9/1986 | Paine | |
| 4,617,639 A | | 10/1986 | Paine | |
| 4,642,787 A | | 2/1987 | McCarthy et al. | |
| 4,742,297 A | | 5/1988 | Heaton et al. | |
| 5,065,320 A | | 11/1991 | Hayashi et al. | |
| 5,138,995 A | * | 8/1992 | Erhard | 123/335 |
| 5,150,568 A | | 9/1992 | White | |
| 5,375,977 A | | 12/1994 | Hill | |
| 5,642,284 A | | 6/1997 | Parupalli et al. | |
| 5,644,491 A | | 7/1997 | Fiske et al. | |
| 5,730,098 A | * | 3/1998 | Sasaki et al. | 123/198 DB |
| 5,857,159 A | | 1/1999 | Dickrell et al. | |
| 5,869,776 A | | 2/1999 | Vuong et al. | |
| 5,913,911 A | | 6/1999 | Beck et al. | |

* cited by examiner

*Primary Examiner*—Edward Lefkowitz
(74) *Attorney, Agent, or Firm*—Watts, Hoffman, Fisher & Heinke Co., L.P.A.

(57) ABSTRACT

A timing circuit for providing an output to a microcontroller indicating whether an engine is operating, wherein the engine has a magneto. The circuit includes a triac coupled to the magneto for switching output generating circuitry between an engine on condition to an engine off condition in response to an operating condition of the engine. The output generating circuitry provides a signal indicating that the engine is not operating to the microcontroller when the circuitry is in an engine off condition and provides a signal indicating that the engine is operating to the microcontroller when the circuitry is in an engine on condition.

15 Claims, 3 Drawing Sheets

ENGINE OPERATION DETECTING CIRCUIT FOR A VISUAL DISPLAY

FIELD OF THE INVENTION

The invention relates to a visual display circuit for monitoring and displaying the operation of a combustion engine and more particularly concerns an circuit for monitoring the operation time of a riding lawn mower.

BACKGROUND ART

Hour meters of various types are commercially available both as an add on device to a combustion engine or supplied as part of a vehicle that has a combustion engine. The hour meter provides information about the amount of time the engine has been operating. This information is useful for scheduling maintenance necessary at predetermined engine run times. In addition, hour meters may be used on test vehicles to calculate the durability of engine components as a function of engine run time.

U.S. Pat. No. 5,644,491 to Fiske et al. concerns a self contained multi-function engine monitor and timer for providing engine running time, job time, service time and tachometer functions. The engine monitor employs a spark sensor in the form of a pick up wire wrapped around a spark plug wire. The spark plug current flowing through the spark plug wire induces a voltage across the coil of the pick up wire. This voltage is sensed by a microcomputer and is used to determine a variety of engine functions. Circuitry is required to filter the signal from the pick up wire to make it suitable for input to the microcomputer.

U.S. Pat. No. 4,617,639 to Paine concerns an hour meter apparatus and method for use with industrial vehicles. The hour meter increments time interval registers whenever the ignition switch of the vehicle is in a position indicating that the vehicle is in operation. Because the hour meter is activated by the ignition switch of the vehicle, engine time may be logged when the ignition switch is turned to the on position, but the vehicle's engine is not running.

SUMMARY OF THE INVENTION

The present invention concerns a timing circuit for providing an output to a monitoring circuit indicating whether an engine having a magneto is operating. In a preferred embodiment, the monitoring circuit is a microcontroller. The timing circuit includes switching means, such as a triac in an exemplary embodiment, coupled to the magneto for switching output generating circuitry between an engine on condition and an engine off condition in response to an operating condition of the engine. The output generating circuitry provides a signal indicating that the engine is not operating to the microcontroller when the circuitry is in an engine off condition and provides a signal indicating that the engine is operating to the microcontroller when the circuitry is in an engine on condition.

In an exemplary embodiment, the triac is activated by pulses generated by the magneto when the engine is operating to place the output generating circuitry in the engine on condition. The triac operates in a conducting mode and the circuitry includes a capacitor that discharges to ground through the triac thereby maintaining the output circuitry in the engine on condition. The triac is deactivated when the magneto is not generating pulses to place the output generating circuitry in the engine off condition such that the triac does not conduct current. The circuitry includes a transistor that switches on when the triac is not conducting current to maintain the output circuitry in the engine off condition.

In an embodiment of the present invention, the microcontroller senses a voltage at the capacitor and records a time between drops in said voltage to determine the RPM of the engine.

DETAILED DESCRIPTION OF THE PREFERRED EMBODIMENT

Figure 1:
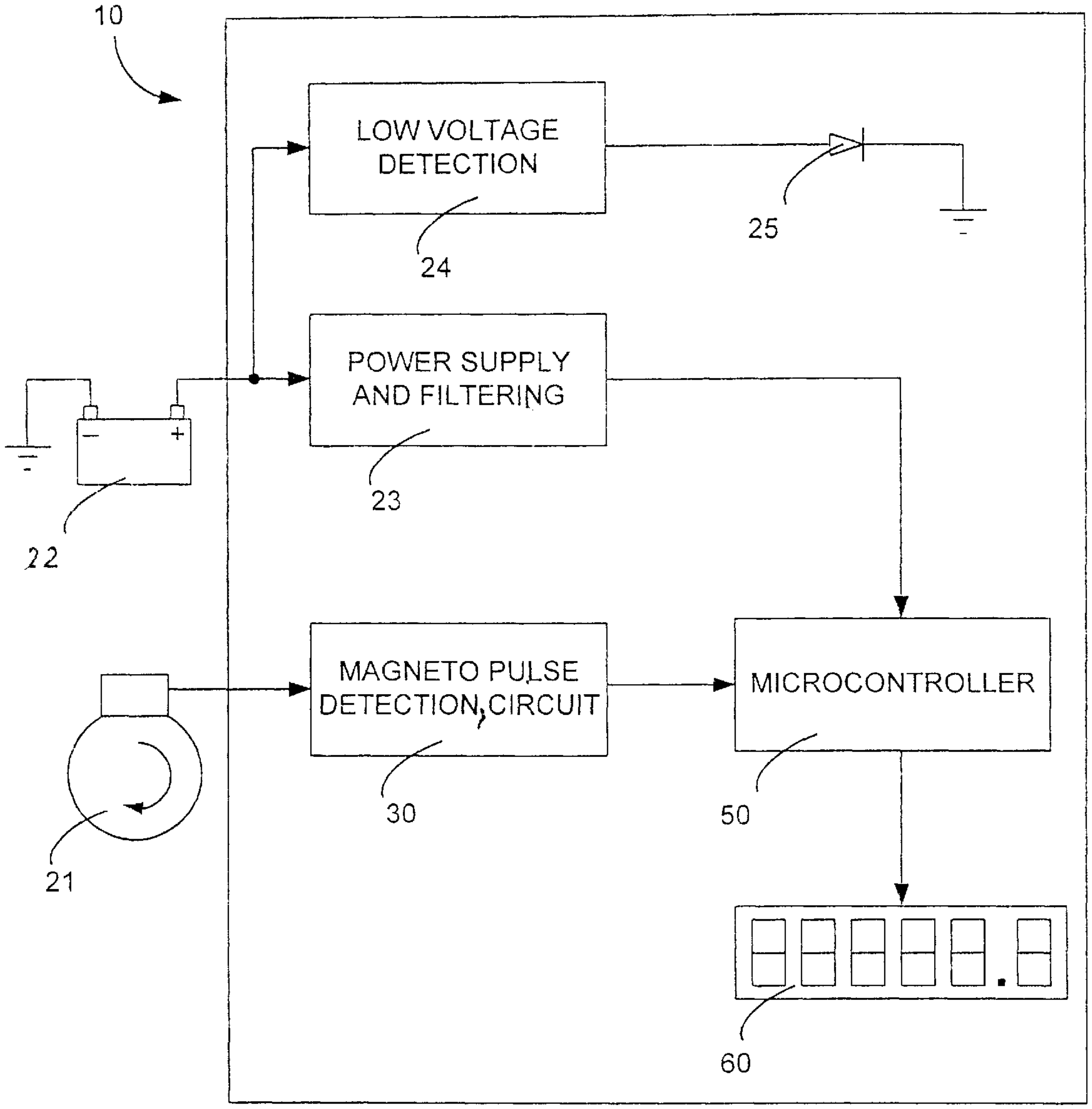
FIG. 1 is a block diagram of an hour meter apparatus that features the engine operation detection circuit of the present invention.

FIG. 1 depicts an hour meter 10 for use with a small combustion engine such as is found in a lawn tractor. The hour meter 10 is coupled to a vehicle battery 22. The battery is in turn coupled to a low voltage detecting circuit 24 that activates a low voltage indicating LED 25 mounted to a riding lawn mower dashboard (not shown). The vehicle battery 22 energizes a power supply and filtering circuit 23 that supplies power to a microcontroller 50.

The hour meter 10 is also coupled to a primary coil of the engine magneto 21. The magneto includes a transformer secondary inductively coupled to the primary that transmits large voltages (approximately 20 kilovolts) to the spark plug each time current through the magneto primary is disrupted. U.S. Pat. No. 4,270,509 to Tharman discloses a typical small engine magneto system for use with a lawn mower and is incorporated herein by reference. An engine operation detection circuit 30, shown in greater detail in FIG. 2, receives pulses from the magneto 21 and provides an output indicative of an engine operating condition to the microcontroller 50. An LCD display 60 mounted to the lawn mower dashboard is coupled to the microcontroller 50 and displays the hours of run time on the engine being monitored by the hour meter.

Figure 2:
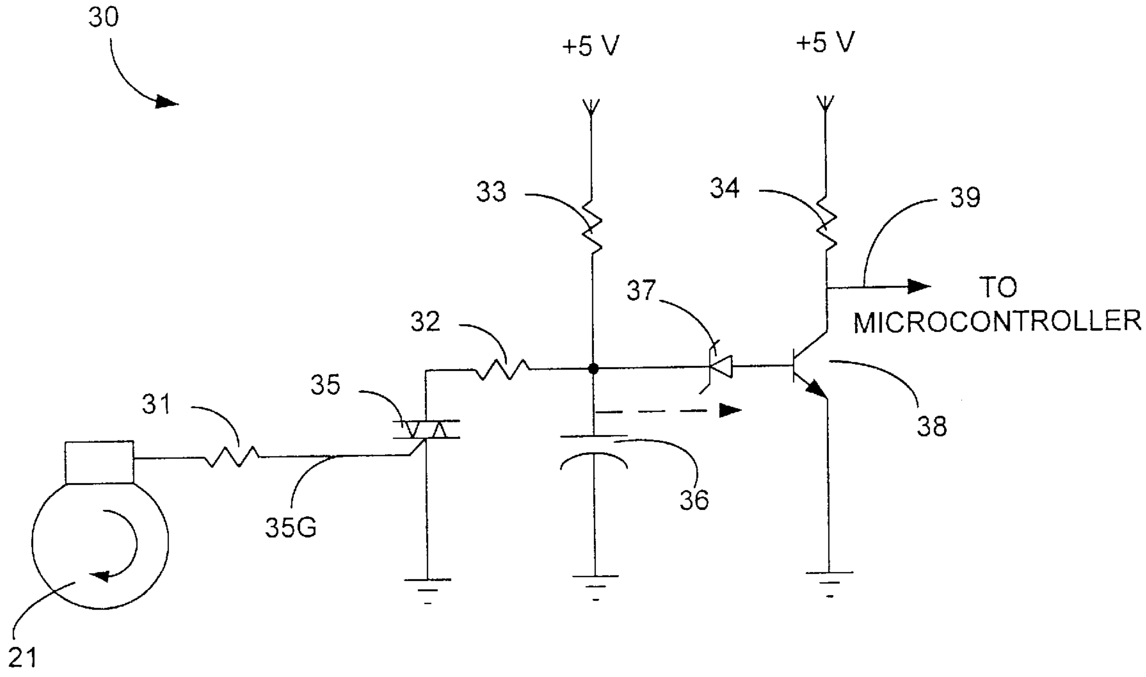
FIG. 2 is a schematic diagram of a circuit constructed in accordance with one embodiment of the present invention that provides an output signal indicative of an operating status of the engine.

FIG. 2 illustrates a schematic diagram of an engine operation detection circuit 30 constructed in accordance with a preferred embodiment of the invention. The circuit senses a magneto (or engine kill) signal from a small gasoline combustion engine such as those produced by Briggs and Stratton, Kohler, Tecumseh, and converts it into a DC voltage suitable for use as a digital input to a microcontroller. Voltage pulses (examples shown in FIG. 3) from the magneto 21 (FIG. 1) pass through a current limiting resistor 31 and to a gate input 35G to a triac 35. A triac commercially available from S.G.S. Thompson having model number Z0103DN has proven suitable for use in the present invention. A benefit of the triac is that it will be turned on by either positive or negative polarity magneto pulses of most small gasoline combustion engines. A resistor 33 serves as a pull up resistor, and a resistor 32 limits the current discharged through the triac 35 from a capacitor 36. A zener diode 37 (such as model number ZMM5228B from Diodes, Inc.) prevents the voltage at the capacitor 36 from turning a transistor 38 on until a certain voltage level is achieved. A model number FMMTA06 from Zetex transistor has proven suitable for use in the present invention. A resistor 34 serves as a pull up resistor and provides for a suitable input level at an output 39 to the microcontroller 50.

When no pulses are present at the input to the triac 35, the triac remains off, and the capacitor 36 charges through the resistor 33. When the zener diode's 37 zener voltage is exceeded, the transistor 38 turns on and pulls the output to the microcontroller 50 low to indicate to the microcontroller that the engine is not running.

Figure 3A:
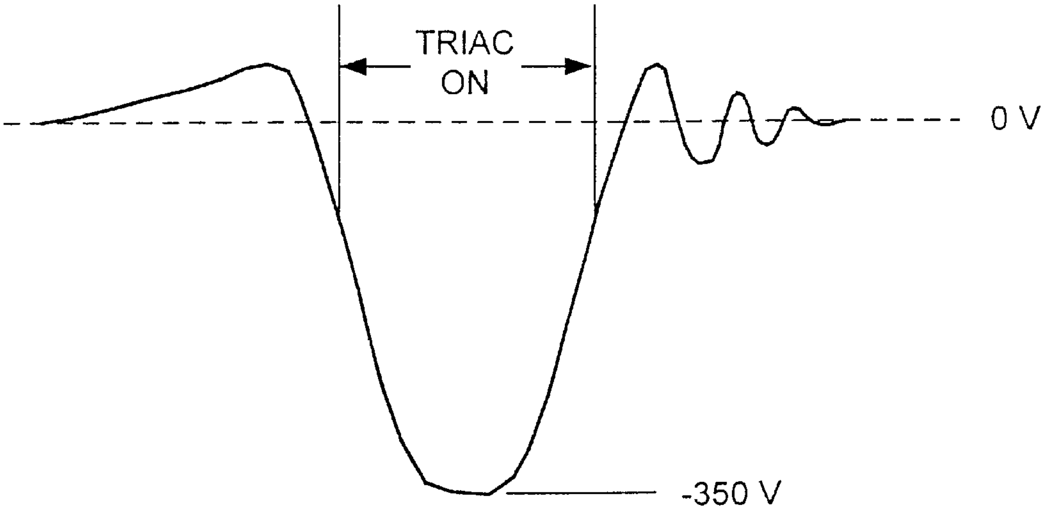
FIGS. 3A and 3B depict waveforms of a magneto signal that triggers the circuit of FIG. 2.
Figure 3B:
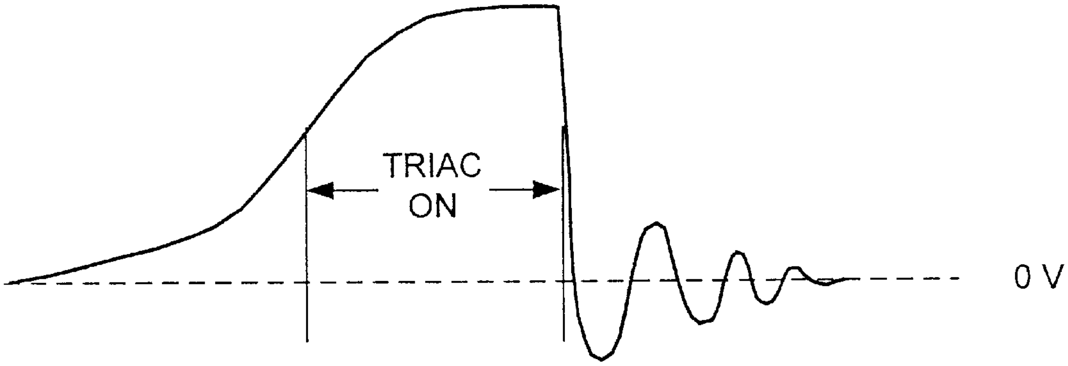

When magneto pulses are present at the input to the triac 35, the triac 35 turns on and discharges the capacitor 36, preventing the transistor 38 from turning on. FIGS. 3A and 3B depict voltage pulses as a function of time from two typical small engine magnetos 21. FIG. 3A depicts a voltage pulse from an inductive type magneto on a Briggs and Stratton engine. FIG. 3B depicts a voltage pulse from a capacitor discharge type magneto on a Tecumseh engine. As can be seen by a comparison of the pulses shown in FIGS. 3A and 3B, the circuit of the present invention can process pulses of either polarity from a wide variety of small gasoline engines. The magneto 21 is coupled to the triac gate input 35G. The triac is active (and thus discharges the capacitor) during the "triac on" time indicated in FIGS. 3A and 3B. The discharge characteristics of the capacitor are tuned so that the capacitor's voltage remains below the zener voltage of the zener diode during the time the triac is off so that the transistor remains non conducting when pulses are present. Thus the output is pulled up to 5 volts output from the power supply 23 to signal the microcontroller that the engine is running.

The circuit 30 can be used to enable/disable a microprocessor incrementing of the display 60 so that the microprocessor only accumulates time while the engine is actually running. In another embodiment, the signal at the capacitor 36 could be sensed by the microcontroller 50 (sense location shown in dashed line) to detect engine RPM by recording the time between drops in the voltage at the capacitor 36.

Several embodiments of the invention have been described with a degree of particularity. It is the intent that the invention encompass all alterations and modifications from these embodiments falling within the spirit or scope of the appended claims.

I claim:

1. A timing circuit for providing an output signal to a monitoring circuit indicating whether an engine is operating, wherein said engine has a magneto, said circuit comprising:

a) switching means coupled to said magneto for periodically switching on and off in response to an operating condition of said engine; and b) output generating circuitry coupled to said switching means for providing a signal indicating that said engine is not operating when said engine is in an off condition and providing a different signal when said engine is in an on condition.

2. The timing circuit of claim 1 wherein said switching means comprises a solid state switch.

3. The timing circuit of claim 1 wherein said switching means comprises a thyristor.

4. The timing circuit of claim 1 wherein said switching means comprises a triac.

5. The timing circuit of claim 2 wherein said solid state switch is activated by pulses generated by said magneto when said engine is operating to place said output generating circuitry in said on condition with said solid state switch in a conducting mode and wherein said circuitry comprises a capacitor that discharges to ground through said solid state switch thereby maintaining said output circuitry in said on condition.

6. The timing circuit of claim 2 wherein said solid state switch is deactivated when said magneto is not generating pulses to place said output generating circuitry in said off condition with the solid state switch not conducting current and wherein said circuitry comprises a transistor that switches to a conducting mode when said solid state switch is not conducting current to maintain said output circuitry in said off condition.

7. The timing circuit of claim 1 wherein said monitoring circuit comprises a microcontroller.

8. The timing circuit of claim 1 comprising a display for displaying a number of hours said engine has operated.

9. A timing circuit for providing an output signal to a microcontroller indicating whether an engine is operating, wherein said engine has a magneto that generates pulses when said engine is operating, said circuit comprising:

a) a thyristor coupled to said magneto for periodically switching on and off in response to an operating condition of said engine, wherein said thyristor conducts current when said magneto is generating pulses and does not conduct current when said magneto is not generating pulses;

b) output generating circuitry coupled to said thyristor comprising a capacitor and a switching transistor, said capacitor coupled between said thyristor and a base input of the switching transistor such that when said magneto is generating pulses said capacitor discharges through said thyristor and maintains said switching transistor in an nonconducting mode to provide a signal indicating that said engine is operating to said microcontroller and wherein said capacitor is coupled to said transistor through a zener diode such that when said magneto is not generating pulses and said thyristor is not conducting said capacitor charges beyond a zener voltage of said zener diode to switch said transistor to conducting mode to provide a signal indicating that said engine is not operating to said microcontroller.

10. The timing circuit of claim 9 wherein said thyristor comprises a triac.

11. The timing circuit of claim 9 further comprising a sensing means coupled to said microcontroller sensing a voltage at said capacitor and wherein said microcontroller records a time between drops in said voltage to determine the RPM of said engine.

12. The timing circuit of claim 9 comprising a display for displaying a number of hours said engine has been operated.

13. A method of providing an output to a microcontroller indicating whether an engine is operating, wherein said engine has a magneto, comprising the steps of:

a) coupling a switching means across a magneto coil that generates a spark plug voltage;

b) charging a capacitor to a voltage;

c) routing magneto generated pulses of either a positive or negative polarity to the switching means to activate the switching means and provide a discharge path to ground to said capacitor; and d) said capacitor to determine an operating condition of said engine.

14. The method of claim 13 wherein said causing step is accomplished by routing said magneto generated pulses to said input switching means to disconnect said discharge path and cause said capacitor to charge.

15. A timing apparatus for monitoring and displaying the operation time of an engine of a riding lawn mower comprising:

a) a microcontroller comprising an engine monitoring circuit;

b) a timing circuit for providing an output signal to said monitoring circuit indicating whether an engine is operating, wherein said engine has a magneto, said circuit comprising:

i) switching means coupled to said magneto for periodically switching on and off in response to an operating condition of said engine; and ii) output generating circuitry coupled to said switching means for providing a signal indicating that said engine is not operating to when said engine is in an off condition and providing a different signal when said engine is in an on condition; and c) a display for displaying a number of hours said engine has operated.

* * * * *